(12) United States Patent
Sasaki (10) Patent No.: US 8,789,509 B2
(45) Date of Patent: *Jul. 29, 2014

(54) PISTON FOR INTERNAL COMBUSTION ENGINE AND PISTON SURFACE TREATMENT METHOD

(75) Inventor: Masato Sasaki, Sagamihara (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/469,310

(22) Filed: May 11, 2012

(65) Prior Publication Data
US 2012/0222646 A1   Sep. 6, 2012

Related U.S. Application Data

(62) Division of application No. 12/725,150, filed on Mar. 16, 2010, now Pat. No. 8,220,433.

(30) Foreign Application Priority Data

Mar. 17, 2009   (JP) .................................. 2009-063764

(51) Int. Cl.
*F16J 1/04*   (2006.01)
(52) U.S. Cl.
USPC ..................................................... 123/193.6
(58) Field of Classification Search
USPC ............... 508/155, 165, 181, 591, 107, 125; 123/19.36, 193.6; 92/223; 28/888.048; 29/888.048
See application file for complete search history.

(56) References Cited

U.S. PATENT DOCUMENTS

| | | | | |
|---|---|---|---|---|
| 1,947,493 A | * | 2/1934 | Rose et al. | 427/275 |
| 2,654,276 A | * | 10/1953 | Jones | 72/101 |
| 4,898,905 A | * | 2/1990 | Kawakami et al. | 524/404 |
| 4,987,865 A | * | 1/1991 | Schenkel | 123/193.6 |
| 5,482,637 A | | 1/1996 | Rao et al. | |
| 5,884,600 A | | 3/1999 | Wang et al. | |
| 7,176,166 B2 | * | 2/2007 | Maeda | 508/106 |
| 7,228,786 B2 | * | 6/2007 | Hamada et al. | 92/155 |

(Continued)

FOREIGN PATENT DOCUMENTS

| | | |
|---|---|---|
| CN | 101134923 A | 3/2008 |
| JP | 4-78319 A | 3/1992 |

(Continued)

OTHER PUBLICATIONS

Japanese Office Action dated Sep. 4, 2012 (four (4) pages).

(Continued)

*Primary Examiner* — Marguerite McMahon
(74) *Attorney, Agent, or Firm* — Crowell & Moring LLP (57) ABSTRACT

A piston for an internal combustion engine includes a piston base material and a film of lubrication coating composition. The coating composition has an inner coating layer formed on a surface of the piston base material and an outer coating layer formed on a surface of the inner coating layer. Each of the inner coating layer and the outer coating layer contains at least one of a polyamide-imide resin, a polyimide resin and an epoxy resin as a binder. The inner coating layer contains 0 to 50 wt % of at least one of graphite and molybdenum disulfide as a solid lubricant, whereas the outer coating layer contains 50 to 95 wt % of at least one of graphite and molybdenum disulfide as a solid lubricant.

6 Claims, 4 Drawing Sheets

(56) References Cited

U.S. PATENT DOCUMENTS

| | | | |
|---|---|---|---|
| 7,377,206 B2* | 5/2008 | Douglas | 92/223 |
| 8,220,433 B2* | 7/2012 | Sasaki | 123/193.6 |
| 2004/0261614 A1* | 12/2004 | Hamada et al. | 92/187 |
| 2005/0139064 A1* | 6/2005 | Hakamata et al. | 92/71 |
| 2005/0188942 A1* | 9/2005 | Hamada et al. | 123/193.4 |
| 2006/0040125 A1* | 2/2006 | Obara et al. | 428/556 |
| 2006/0117947 A1 | 6/2006 | Tabata et al. | |
| 2008/0060603 A1 | 3/2008 | Kuroda et al. | |
| 2009/0051122 A1* | 2/2009 | Tamegai et al. | 277/434 |
| 2009/0051123 A1 | 2/2009 | Kariya et al. | |
| 2009/0136747 A1* | 5/2009 | Kikuchi | 428/339 |
| 2009/0156437 A1 | 6/2009 | Kuroda et al. | |

FOREIGN PATENT DOCUMENTS

| | | |
|---|---|---|
| JP | 6-279708 A | 10/1994 |
| JP | 7-97517 A | 4/1995 |
| JP | 7-189804 A | 7/1995 |
| JP | 9-79262 A | 3/1997 |
| JP | 10-37962 A | 2/1998 |
| JP | 2001-279495 A | 10/2001 |
| JP | 2008-19718 A | 1/2008 |
| JP | 2008-56750 A | 3/2008 |

OTHER PUBLICATIONS

Chinese Office Action including English language translation dated Jan. 31, 2012 (sixteen (16) pages).

"Aluminium alloy castings" JIS Japanese Industrial Standard, JIS H 5202, 1999 First English edition published in Jul. 2000 (Twenty (20) pages).

"Grey Iron Castings" JIS G 5501, 1995 (pp. 2075-2077).

Japanese Office Action dated Jul. 12, 2011 (Three (3) pages).

* cited by examiner

PISTON FOR INTERNAL COMBUSTION ENGINE AND PISTON SURFACE TREATMENT METHOD

This application is a divisional of U.S. patent application Ser. No. 12/725,150, filed Mar. 16, 2010, now U.S. Pat. No. 8,220,433, issued Jul. 17, 2012, which in turn claims the priority of Japanese application 2009-063764, filed Mar. 17, 2009. The entire disclosure of each of the above-identified applications is incorporated herein by reference.

BACKGROUND OF THE INVENTION

The present invention relates to a piston for an internal combustion engine and a surface treatment method for the piston.

Various compositions of binder resins and solid lubricants have been proposed as lubrication coating compositions for improving the wear resistance and seizing resistance of sliding members such as pistons of internal combustion engines.

Japanese Laid-Open Patent Publication No. 07-097517 discloses one such a lubrication coating composition, which contains 50 to 73 wt % of at least one of a polyamide-imide resin and a polyimide resin as a binder and 3 to 15 wt % of polytetrafluoroethylene, 20 to 30 wt % of molybdenum disulfide and 2 to 8 wt % of graphite as a solid lubricant (i.e. the total content amount of the solid lubricant falls within the range of 27 to 50 wt %) to attain a low friction coefficient and high wear resistance. The seizing resistance of the lubrication coating composition can be improved by the addition of molybdenum disulfide and graphite. However, the film of the lubrication coating composition significantly decreases in strength when more than the necessary amounts of molybdenum disulfide and graphite are added to the coating composition. This leads to an increase in the amount of wear of the coating composition film.

On the other hand, Japanese Laid-Open Patent Publication No. 2008-056750 discloses a double-layer lubrication coating composition for an engine piston, which includes an inner (lower) coating layer formed on a base metal material (e.g. aluminum alloy) of the piston and containing 50 to 79 wt % of at least one of an epoxy resin and a polyamide-imide resin as a binder and 15 to 30 wt % of polytetrafluoroethylene and 5 to 20 wt % of molybdenum disulfide as a solid lubricant and an outer (upper) coating layer formed on a surface of the inner (lower) coating layer opposite to a surface facing the piston base material and containing 50 to 70 wt % of at least one of an epoxy resin and a polyamide-imide resin as a binder, 5 to 20 wt % of boron nitride as a solid lubricant and 15 to 30 wt % of at least one of silicon nitride and alumina as hard particles. This double-layer lubrication coating composition can combine high wear resistance with high seizing resistance.

SUMMARY OF THE INVENTION

In the disclosed double-layer lubrication coating composition, the contents of the boron nitride solid lubricant and the silicon nitride and/or alumina hard particles in the outer coating layer are controlled to 5 to 20 wt % and 15 to 30 wt %, respectively, so that the surface of the outer coating layer is more susceptible to wear than the base metal material such as aluminum alloy but is relatively hard. It thus takes a long time until the surface of the outer coating layer gets worn and smooth during sliding against its opposing member. As a result, the double-layer lubrication coating composition cannot ensure sufficient initial adaptability (i.e. ability to wear and make the sliding surface smooth quickly in a short time during sliding against the opposing member after initiation of use).

It is therefore an object of the present invention to provide a piston for an internal combustion engine, in which a lubrication coating composition has good adhesion to a base material of the piston and good initial adaptability with a cylinder wall of the engine. It is also an object of the present invention to provide a surface treatment method for such an engine piston.

According to one aspect of the present invention, there is provided a piston for an internal combustion engine, comprising: a piston base material; and a film of lubrication coating composition having an inner coating layer formed on a surface of the piston base material and an outer coating layer formed on a surface of the inner coating layer opposite to a surface facing the piston base material, the inner coating layer containing at least one of a polyamide-imide resin, a polyimide resin and an epoxy resin as a binder and 0 to 50% by weight or less of at least one of graphite and molybdenum disulfide as a solid lubricant based on the total weight of the inner coating layer, the outer coating layer containing at least one of a polyamide-imide resin, a polyimide resin and an epoxy resin as a binder and 50 to 95% by weight of at least one of graphite and molybdenum disulfide as a solid lubricant based on the total weight of the outer coating layer.

According to another aspect of the present invention, there is provided a piston for an internal combustion engine, comprising: a piston base material; and a film of lubrication coating composition having an inner coating layer formed on a surface of the piston base material and an outer coating layer formed on a surface of the inner coating layer opposite to a surface facing the piston base material, the outer coating layer being made of a material more susceptible to wear than that of the inner coating layer.

According to still another aspect of the present invention, there is provided a surface treatment method for a piston, comprising; providing a base material of the piston; forming an inner coating layer on a surface of the piston base material, the inner coating layer containing at least one of a polyamide-imide resin, a polyimide resin and an epoxy resin as a binder and at least one of graphite and molybdenum disulfide as a solid lubricant; and forming an outer coating layer on a surface of the inner coating layer opposite to a surface facing the piston base material, the outer coating layer containing at least one of a polyamide-imide resin, a polyimide resin and an epoxy resin as a binder and at least one of graphite and molybdenum disulfide as a solid lubricant, said forming the inner coating layer comprising controlling the content of the solid lubricant in the inner coating layer to 0 to 50% by weight based on the total weight of the inner coating layer, said forming the outer coating layer comprising controlling the content of the solid lubricant in the outer coating layer to 50 to 95% by weight based on the total weight of the outer coating layer.

The other objects and features of the present invention will also become understood from the following description.

BRIEF DESCRIPTION OF THE DRAWINGS

FIGS. 4A1 and 4A2 are schematic views of surface states of the piston with the lubrication coating composition, before and after wearing, according to the one embodiment of the present invention.

FIGS. 4B1 and 4B2 are schematic views of surface states of a piston with a conventional lubrication coating film before and after wearing.

FIGS. 4C1 and 4C2 are schematic views of surface states of a piston with no surface treatment before and after wearing.

DESCRIPTION OF THE EMBODIMENTS

The present invention will be described in detail below with reference to the drawings.

Figure 1:
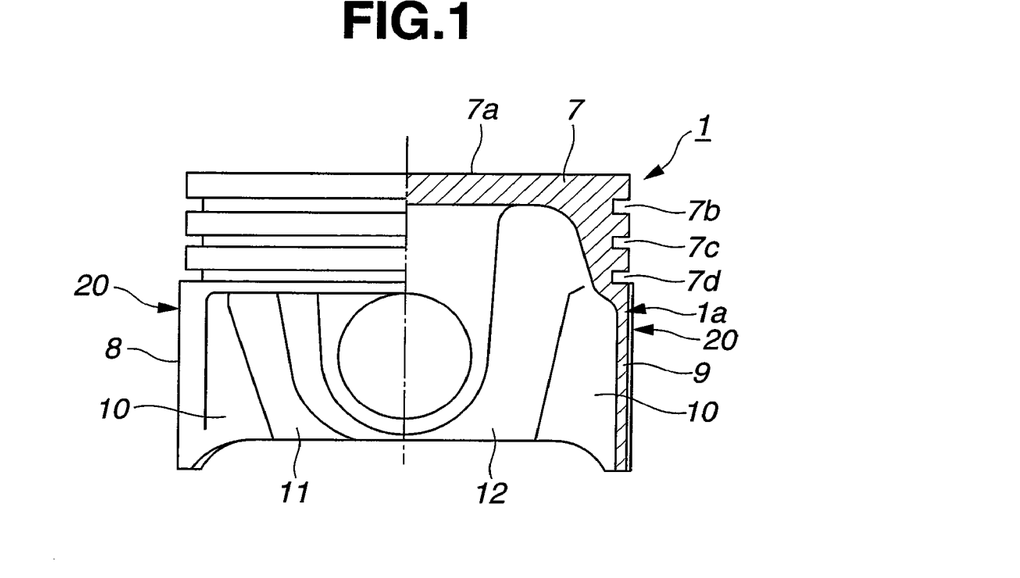
FIG. 1 is a cross-section view of substantive part of a piston for an internal combustion engine that has a piston base material coated with a lubrication coating composition according to one embodiment of the present invention.
Figure 2:
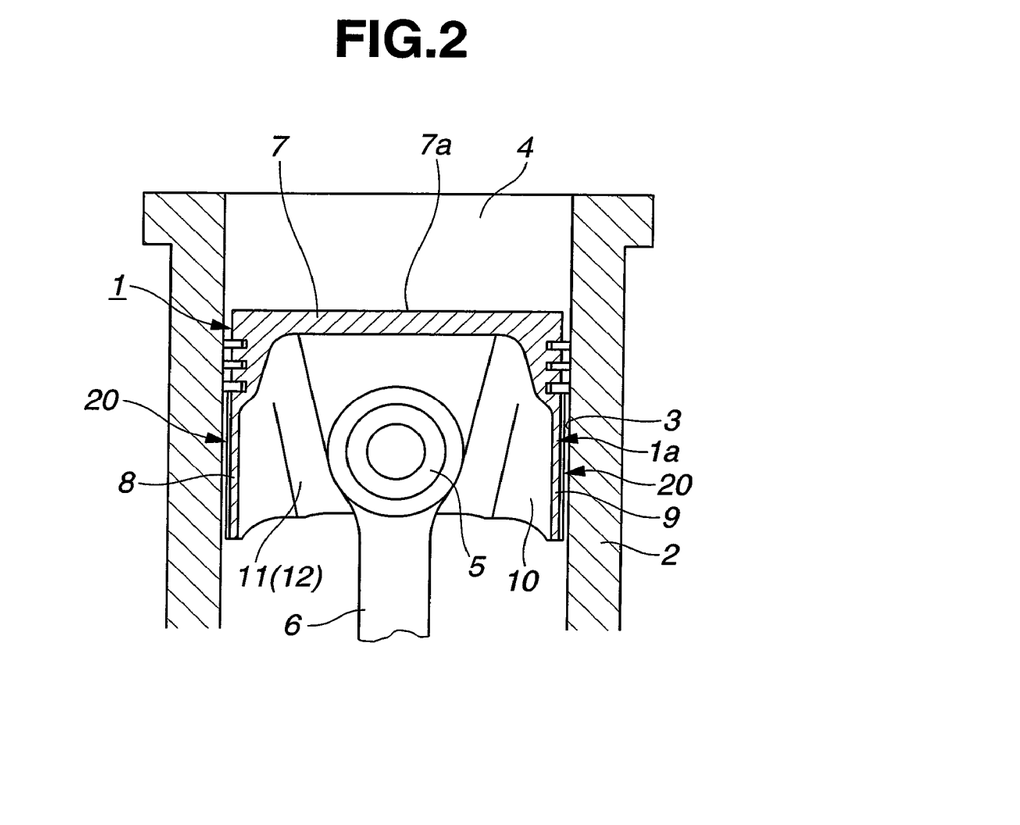
FIG. 2 is a front, partially cross-section view of the piston according to the one embodiment of the present invention.

The following embodiment of the present invention specifically refers to a piston 1 designed for use in an internal combustion engine e.g. four-cycle gasoline engine as shown in FIGS. 1 and 2. The piston 1 is slidably mounted to a cylinder block 2 of the engine and connected to a crankshaft of the engine by a piston pin 5 and a connecting rod 6 so as to slide against a substantially cylindrical cylinder wall 3 of the cylinder block 2 and cause a rotational movement of the crankshaft with reciprocating sliding motion of the piston 1.

As shown in FIGS. 1 and 2, the piston 1 has its body formed in one piece by forging of base material 1a such as aluminum alloy, e.g., Al—Si alloy AC8A (JIS H 5202) and includes a piston crown portion 7 (also called a "piston head portion"), a pair of thrust-side and counterthrust-side piston skirt portions 8 and 9 and a pair of piston apron portions 11 and 12. The piston crown portion 7 has a substantially cylindrical (disc) shape with a relatively large thickness. There is a combustion chamber 4 defined by a cylinder head of the engine, a top surface 7a of the piston crown portion 7 and the cylinder wall 3. A valve recess is formed in the top surface 7a of the piston crown portion 7 to avoid interference with engine intake/exhaust valves. Further, ring grooves 7b, 7c and 7d are formed in an outer circumferential surface of the piston crown portion 7 to hold therein three piston rings (such as pressure ring, oil ring etc.). The piston skirt portions 8 and 9 are formed integrally with a bottom edge of the piston crown portion 7 and located symmetrical with respect to the axis of the piston 1. Each of the piston skirt portions 8 and 9 has a substantially arc-shaped cross section with a relatively small thickness throughout almost its entirety. The thrust-side piston skirt portion 8 is adapted to, when the piston 1 moves down to the bottom dead center (BDC) during an expansion stroke, incline toward and come in contact under pressure with a thrust side of the cylinder wall 3 due to the angular positional relationship of the piston 1 and the connecting rod 6 due to the angular relationship of the piston 1 and the connecting rod 6. On the other hand, the counterthrust-side piston skirt portion 9 is adapted to, when the piston 1 moves up to the top dead center (TDC) during a compression stroke, incline toward and come in contact under pressure with a counterthrust side of the cylinder wall 3. As the thrust-side piston skirt portion 8 is in sliding contact with the cylinder wall 3 under the influence of a combustion pressure, the contact pressure load of the thrust-side piston skirt portion 8 on the cylinder wall 3 is larger than the contact pressure load of the counterthrust-side piston skirt portion 9 on the cylinder wall 3. The piston apron portions 11 and 12 are connected to circumferentially opposite sides of the piston skirt portions 8 and 9 by connection parts 10, respectively.

As shown in FIGS. 1 and 2, the piston 1 also has a film of lubrication coating composition 20 applied to the piston base material 1a, notably on outer circumferential surfaces of the engine skirt portions 8 and 9. The coating composition 20 has an inner (lower) coating layer 22 formed on a surface of the piston base material 1a and an outer (upper) coating layer 21 formed on a surface of the inner coating layer 22 opposite to a surface facing the piston base material 1a, as shown in FIGS. 4A1 and 4B2, for sliding against the cylinder wall 3.

The outer coating layer 21 and the inner coating layer 22 each contain at least one of a polyamide-imide resin (PAI), a polyimide resin (PI) and an epoxy resin (EP) as a binder, which show high heat resistance, high wear resistance and good adhesion to the piston base material 1a. The outer coating layer 21 contains at least either one or both of graphite (GF) and molybdenum disulfide ($MoS_2$) as a solid lubricant, whereas the inner coating layer 22 preferably (but not necessarily) contains at least either one or both of graphite (GF) and molybdenum disulfide ($MoS_2$) as a solid lubricant. In the present embodiment, the material of the outer coating layer 21 is more susceptible to wear than the material of the inner coating layer 22.

Figure 4A:
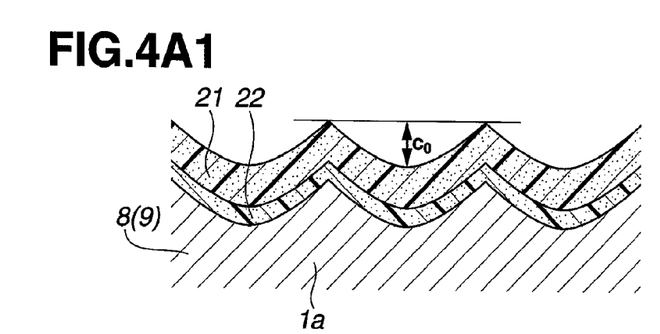

In an initial state (before use), the piston 1 shows a surface roughness with streaks, i.e. grooves, as shown in FIG. 4A1.

Figure 4A:
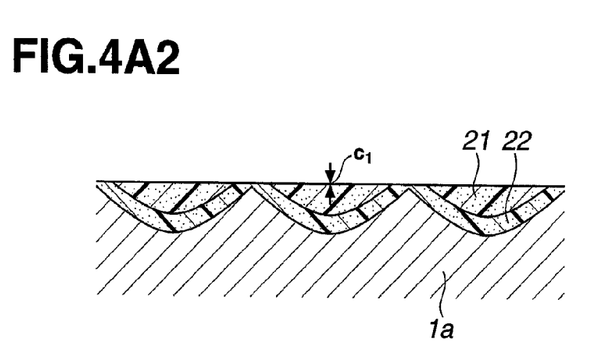
Figure 4B:
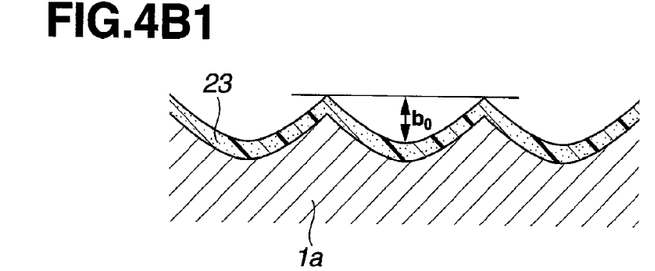
Figure 4B:
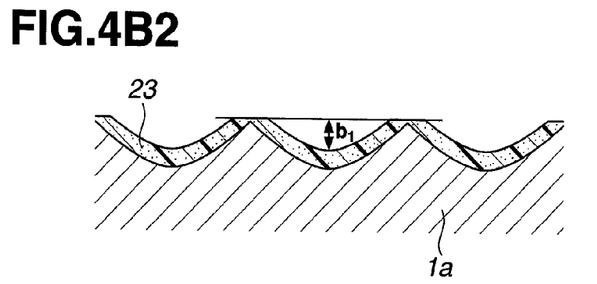
Figure 4C:
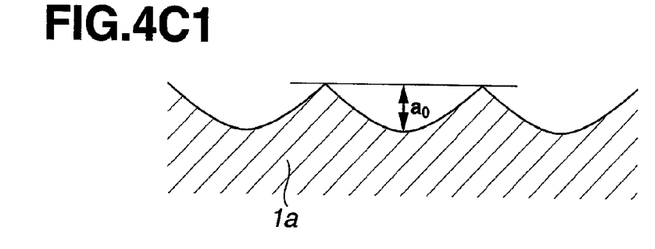
Figure 4C:
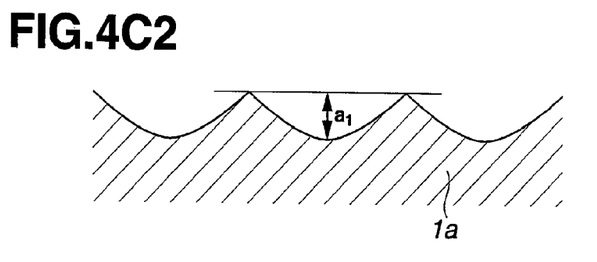

In the case where the piston 1" is not surface treated (i.e. no coating composition is applied to the piston base material 1a) as shown in FIG. 4C1, it is unlikely that the sliding surface of the piston 1" (the surface of the piston base material 1a) will become worn and smooth due to the relatively high wear resistance of the piston base material 1a. As shown in FIG. 4C2, the surface roughness (streak height) of the piston 1" decreases merely slightly from a0 to a1 during sliding against the cylinder wall 3. The untreated piston 1" cannot attain a low friction coefficient.

In the present embodiment, by contrast, the piston 1 is surface treated with the double-layer coating composition 20 as shown in FIG. 4A1. The double-layer coating composition 20 is more susceptible to wear than the piston base material 1a. In particular, the material of the outer coating layer 21 is more susceptible wear than the material of the inner coating layer 22. The sliding surface of the piston 1 becomes smooth by wear of the coating composition 20, notably the outer coating layer 21, during sliding against the cylinder wall 3. As shown in FIG. 4A2, the surface roughness (streak height, i.e. groove depth) of the piston 1 decreases significantly from an initial level c0 to a lower level c1 (a1>c1). The friction coefficient of the piston 1 can be thus reduced to a much lower value than that of the untreated piston 1".

In the case where the piston 1' is surface treated with a conventional single-layer coating composition 23 as shown in FIG. 4B1, the sliding surface of the piston 1' becomes smooth by wear of the coating composition 23 during sliding against the cylinder wall 3. The conventional single-layer coating composition 23 is more susceptible to wear than the piston base material 1a, but is less susceptible to wear than the outer coating layer 21 of the double-layer coating composition 20. The surface roughness (streak height) of the conventional surface-treated piston 1' decreases a lower level b1 than that of the untreated piston 1″, but cannot decrease to the same level to that of the piston 1 (a1>b1>c1) as shown in FIG. 4B2.

In this way, the low-friction and wear characteristics of the piston 1 can be improved more effectively by the application of the double-layer coating composition 20 than by the application of the conventional single-layer coating composition 23.

More specifically, the outer coating layer 21 contains 5 to 50% by weight of at least one of the polyamide-imide resin, the polyimide resin and the epoxy resin as the binder and 50 to 95% by weight of either one or both of the graphite and the molybdenum disulfide as the solid lubricant.

Figure 3A:
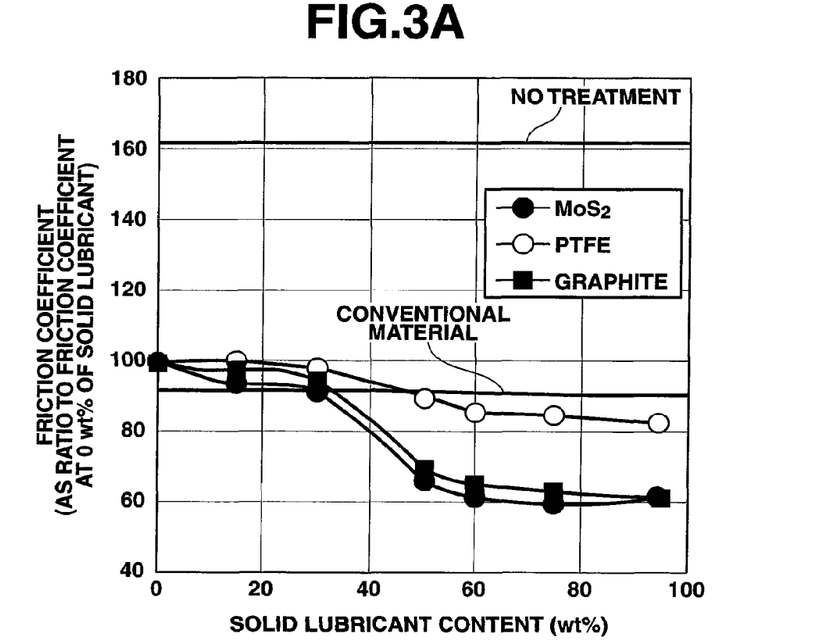
FIG. 3A is a characteristic diagram showing test results on the relationship between the content of a solid lubricant in an outer coating layer of the lubrication coating composition and the friction coefficient of the lubrication coating composition.
Figure 3B:
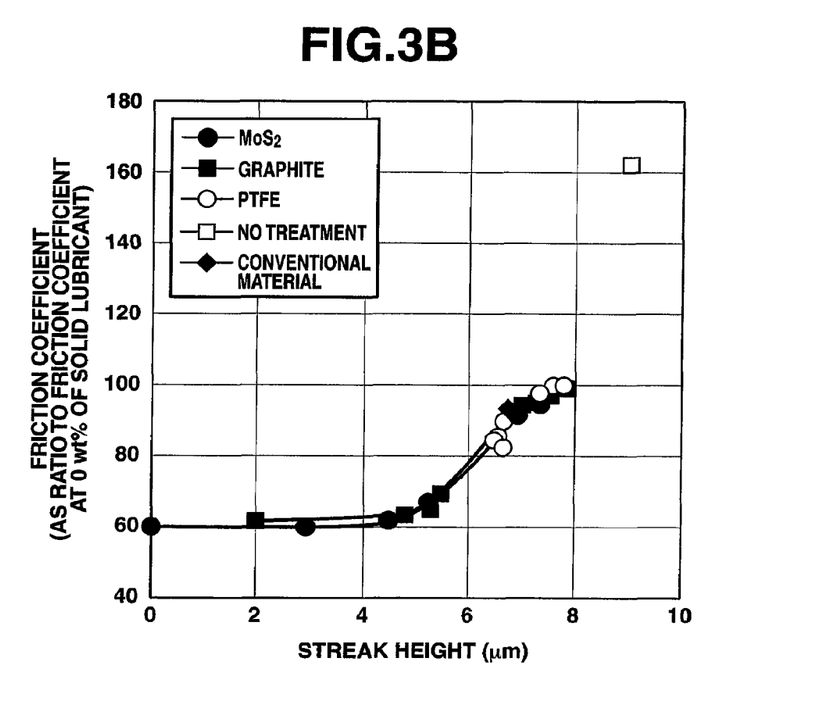
FIG. 3B is a characteristic diagram showing test results on the relationship between the surface roughness (streak height) and friction coefficient of the lubrication coating composition.

FIG. 3A shows test results on the relationship between the content of the graphite and/or molybdenum disulfide solid lubricant in the outer coating layer 21 and the friction coefficient of the coating composition 20; and FIG. 3B shows test results on the relationship between the surface roughness (streak height) and friction coefficient of the coating composition 20. In FIGS. 3A and 3B, the friction coefficient is expressed as a ratio to that of a reference sample where the outer coating layer has no solid lubricant content. (See the after-mentioned examples.)

As shown in FIG. 3B, the friction coefficient of the coating composition 20 is uniquely defined by the streak height of the coating composition 20. When the streak height is smaller than or equal to 5 μm, the friction coefficient remains substantially constant at a minimum value. It is thus desirable to wear the surface of the coating composition 20, notably the outer coating layer 21, quickly in a short time so that the coating composition 20 can obtain a low friction coefficient.

As shown in FIG. 3A, the friction coefficient of the coating composition 20 can be reduced effectively when the content of the solid lubricant in the outer coating layer 21 is 50 wt % or more. Particularly, the use of the molybdenum disulfide as the solid lubricant is more effective in reducing the friction coefficient than the graphite and polytetrafluoroethylene as seen in FIG. 3A. However, the adhesion of the outer coating layer 21 to the inner coating layer 22 decreases with decrease in binding force of the binder resin if the content of the binder resin in the outer coating layer 21 is less than 5 wt % (i.e. the content of the solid lubricant in the outer coating layer 21 exceeds 95 wt %). If the content of the binder resin in the outer coating layer 21 exceeds 50 wt % (i.e. the content of the solid lubricant in the outer coating layer 21 is less than 50 wt %) as in the case of the previously disclosed double-layer coating composition of Japanese Laid-Open Patent Publication No. 2008-056750, the wear of the outer coating layer 1 cannot be promoted effectively so that the initial adaptability of the coating composition 20 becomes lowered. The application of the previously disclosed double-layer coating composition leads to a lower friction coefficient than that with no surface treatment, but cannot reach the same level as that by the application of the double-layer coating composition 20. The content of the graphite and/or molybdenum disulfide solid lubricant in the outer coating layer 21 is thus controlled to 50 to 95 wt % in order to improve the low-friction and wear characteristics of the piston 1 more effectively by the application of the double-layer coating composition 20 of the present embodiment than by the application of the previously disclosed double-layer coating composition of Japanese Laid-Open Patent Publication No. 2008-056750 so that the coating composition 20 can attain good initial adabtability.

On the other hand, the inner coating layer 22 contains 50 to 100 wt % of at least one of the polyamide-imide resin, the polyimide resin and the epoxy resin as the binder and 0 to 50 wt % of at least one of the graphite and the molybdenum disulfide as the sold lubricant.

Figure 5:
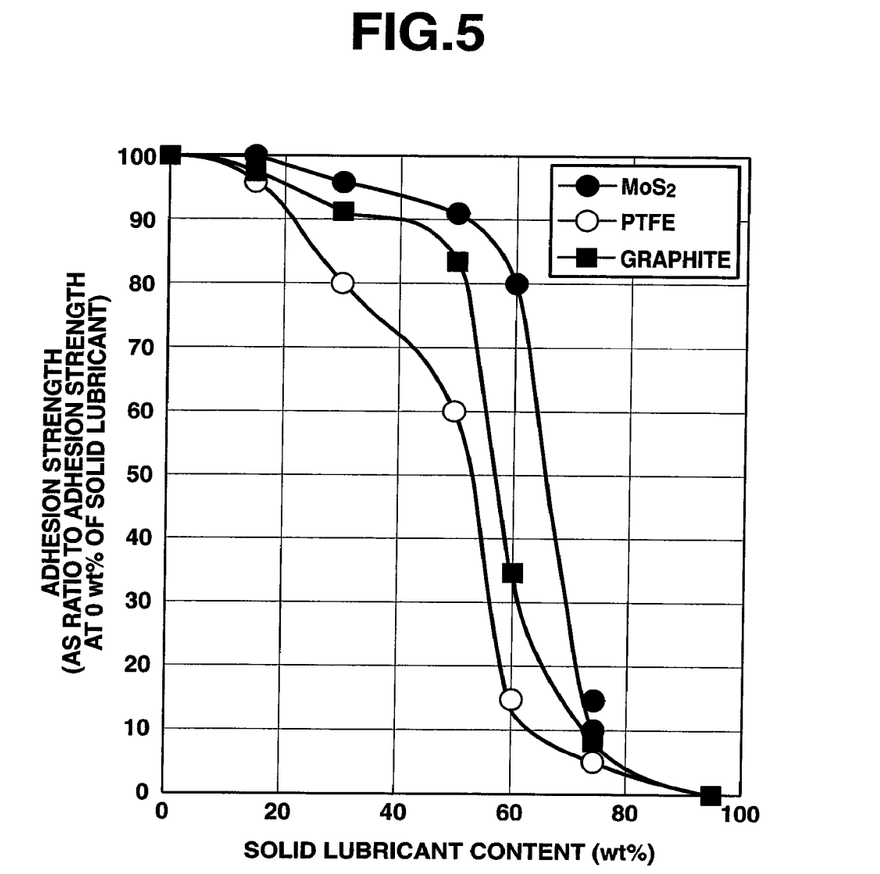
FIG. 5 is a characteristic diagram showing test results on the relationship between the content of a solid lubricant in an inner coating layer of the lubrication coating composition and the strength of adhesion of the lubrication coating composition to the piston base material.

FIG. 5 shows test results on the relationship between the content of the graphite and/or molybdenum disulfide solid lubricant in the inner coating layer 22 and the strength of adhesion of the inner coating layer 22 to the piston base material 1a. In FIGS. 3A and 3B, the adhesion strength is expressed as a ratio to that of a reference sample where the inner coating layer has no solid lubricant content. (See the after-mentioned examples.)

As shown in FIG. 5, the adhesion of the inner coating layer 22 to the piston base material 1a significantly decreases if the content of the binder resin in the inner coating layer 22 is less than 50 wt % (i.e. the content of the solid lubricant in the inner coating layer 22 exceeds 50 wt %). As the inner coating layer 22 has the function of securing the adhesion to the piston base material 1a and to the outer coating layer 21, the solid lubricant is not necessarily contained in the inner coating layer 22 but is preferably added to improve the coating film characteristics within the range that can secure the adhesion of the inner coating layer 22 to the piston base material 1a and to the outer coating layer 21. For example, the seizing resistance of the coating composition 20 can be improved favorably by the synergic effect of the graphite and the molybdenum disulfide.

It is accordingly possible in the present embodiment to not only secure good adhesion of the coating composition 20 to the piston base material 1a but also improve the initial adaptability of the coating composition 20 with the cylinder wall 3 by controlling the binder resin contents and solid lubricant contents of the inner and outer coating layers 22 and 21 to within the above-specified ranges.

The coating composition 20 (the outer coating layer 21 and the inner coating layer 22) can be formed as follows.

The materials of the coating layers 21 and 22 are each prepared by blending the binder resin with an organic solvent and mixing and dispersing the solid lubricant and, optionally, hard particles in the resin solution through the use of a bead mill etc. At this time, the amounts of the binder resin, the solid lubricant and the hard particles are in weight percentages based on the total weight as 100 wt % of the coating layer 21, 22. The material of the coating layer 21, 22 may be diluted to a paint with an organic solvent as needed. The thus-obtained materials of the inner coating layer 22 and the outer coating layer 21 are applied sequentially to the outer circumferential surface of the piston base material 1a (the piston skirt portions 8 and 9) and then hardened by baking or drying, thereby forming the coating composition 20 in which the inner coating layer 22 and the outer coating layer 21 are laminated on the piston base material 1a.

There is no particular restriction on the organic solvent. Any organic solvent can be used as long as it is capable of dissolving therein the binder resin or coating material.

There are also no particular restrictions on the baking temperature and time. The baking temperature and time can be set as appropriate. The coating composition 20 can be formed by baking even at a temperature of 200° C. or lower and thus can suitably be used for the piston 1 where the base material 1a is aluminum alloy.

Further, the thickness of the coating composition 20 can be set as appropriate. In view of the workability and cost, the thickness of the coating composition 20 is preferably about 5 to 40 μm. For example, the piston 1 satisfies the dimensional conditions of $t2 \geq a-5$ (μm) and $t1 \geq 2$ (μm) where t1 is the thickness of the inner coating layer 22; t2 is the thickness of the outer coating layer 21; a is the streak height in the initial state before wear of the coating composition 20.

The followings are the specific surface treatment techniques for forming the coating composition 20.

[Surface Treatment Technique 1]

First, dirt and oil are removed from the surface of the piston base material 1a by pretreatment such as solvent degreasing or alkali degreasing. Next, the inner coating layer 22 is formed on the surface of the piston base material 1a by any known process such as air spraying or screen printing. The outer coating layer 21 is subsequently formed on the surface of the inner coating layer 22 by any known process. The coating layers 22 and 21 are dried to remove therefrom the organic solvent, and then, baked simultaneously in a furnace under predetermined conditions of e.g. at 180° C. for 30 minutes or at 200° C. for 20 minutes. With this, the coating composition 20 is completed.

[Surface Treatment Technique 2]

First, dirt and oil are removed from the surface of the piston base material 1a by pretreatment such as solvent degreasing or alkali degreasing. Next, the inner coating layer 22 is formed on the surface of the piston base material 1a by any known process such as air spraying or screen printing. The inner coating layer 22 is then baked in a furnace under predetermined conditions of e.g. at 180° C. for 30 minutes or at 200° C. for 20 minutes. The piston base material 1a with the inner coating layer 22 is taken out of the furnace. At the time the piston base material 1a reaches a temperature of 50 to 120° C., the outer coating layer 21 is formed on the surface of the inner coating layer 22 by any known process. The outer coating layer 21 is dried without baking With this, the coating composition 20 is completed. The outer coating layer 21 may alternatively be baked as needed.

The use of the coating composition 20 is not limited to the piston 1 of the internal combustion engine. The coating composition 20 is fit for a wide range of uses in sliding members under oil lubrication conditions and under dry lubrication conditions. Although the aluminum alloy is used as the piston base material 1a in the above embodiment, there can be used any other base material such as cast iron, steel or copper alloy in place of the aluminum alloy in view of the fact that the binder resin (polyamide-imide resin, polyimide resin, epoxy resin) of the coating composition 20 has good adhesion to the piston base material 1a. Among others, the coating composition 20 is suitable for application to the piston 1 of the internal combustion engine, notably the thrust-side and counterthrust-side skirt portions 8 and 9 of the piston 1 as explained above.

The present invention will be described in more detail by reference to the following examples. It should be however noted that the following examples are only illustrative and not intended to limit the invention thereto.

[Sample Nos. 1-21]

Outer coating materials were prepared by using a polyamide-imide resin (PAI) as a binder and graphite (GF), molybdenum disulfide ($MoS_2$) or polytetrafluoroethylene (PTFE) as a solid lubricant. The solid lubricant contents of the outer coating materials were varied from 0 to 95 wt %. Inner coating materials were prepared by using a polyamide-imide resin (PAI) as a binder and graphite (GF) as a solid lubricant. The solid lubricant contents of the inner coating materials were set to 33 wt %. The prepared inner and outer coating materials were each added to and dispersed in an organic solvent by means of a bead mill for 30 minutes, thereby obtaining inner and outer coating paint materials.

Further, test pieces of aluminum alloy AC8A (JIS H 5202) were prepared as base materials.

The test pieces of Sample Nos. 1 to 20 were coated with double-layer coating composition films as shown in FIG. 4A1 by the following surface treatment. The inner coating paint material was first applied to a surface of the test piece to form an inner coating layer with a thickness of 3 to 6 μm. The inner coating layer was baked in a furnace at 190° C. for 30 minutes. After that, the outer coating paint material was applied to a surface of the inner coating layer to form an outer coating layer with a thickness of 5 to 11 μm. The outer coating layer was air-dried without baking. The test piece of Sample No. 21 was used as it is, as shown in FIG. 4C1, without the surface treatment. Each of the test pieces had a surface profile as shown in FIGS. 4A1 and 4C1 with a surface roughness (streak height) of 10 μm.

The friction coefficient of the test pieces of Sample Nos. 1 to 21 was measured by friction-wear test. Herein, the friction-wear test was performed using a chip-on-ring type friction and wear testing machine under the following conditions.

[Test Conditions]

Sliding rate: 2 msec
Opposing member: FC250 (JIS G 5501)
Sliding distance: 600 m
Surface pressure: 1.3 MPa
Lubrication (Engine oil drop rate): 5 mg/min The surface roughness (streak height) of the test pieces was also evaluated after the friction-wear test.

The binder resin contents and solid lubricant contents and the test/evaluation results of the coating compositions are indicated in TABLE 1 and FIGS. 3A and 3B. In TABLE 1 and FIGS. 3A and 3B, the friction coefficient was expressed as a ratio to that of Sample No. 1 (where the solid lubricant content of the outer coating layer is 0 wt %).

The streak height of the untreated test piece of Sample No. 21 was reduced from 10 μm to 9 μm during the friction-wear test (i.e. the amount of wear of the untreated test piece during the friction-wear test was only 1 μm). The untreated test piece of Sample No. 21 had a very high friction coefficient value of 162%.

On the other hand, the surface-treated test pieces of Sample Nos. 4 to 7 and 10 to 13 in which the outer coating layer contained 50 to 95 wt % of graphite or molybdenum disulfide as the solid lubricant were worn more than the untreated test piece of Sample No. 21. The streak height of the surface-treated test pieces of Sample Nos. 4 to 7 and 10 to 13 after the friction-wear test was smaller than that of the untreated test piece of Sample No. 21. The friction coefficient of the surface-treated test pieces of Sample Nos. 4 to 7 and 10 to 13 was lower than that of the untreated test piece of Sample No. 21. For example, the test piece of Sample No. 6 was worn by 7 μm so that the streak height of the test piece was reduced from 10 μm to 3 μm during the friction-wear test, and thus had a much lower friction coefficient value of 60%.

The surface-treated test pieces of Sample Nos. 2, 3, 8 and 9 in which the outer coating layer contained less than 50 wt % of graphite or molybdenum disulfide as the solid lubricant were worn more than the untreated test piece of Sample No. 21 during the friction-wear test. The surface-treated test pieces of Sample Nos. 14 to 20 in which the outer coating layer contained polytetrafluoroethylene as the solid lubricant were also worn more than the untreated test piece of Sample No. 21 during the friction-wear test. However, the amounts of wear of the surface-treated test pieces of Sample Nos. 2, 3, 8, 9 and 14 to 20 were less than those of the surface-treated test pieces of Sample Nos. 4 to 7 and 10 to 13. The streak height of the surface-treated test pieces of Sample Nos. 2, 3, 8, 9 and 14 to 20 was smaller than that of the untreated test piece of Sample No. 21 but larger than that of the surface-treated test pieces of Sample Nos. 4 to 7 and 10 to 13. The friction coefficient of the surface-treated test pieces of Sample Nos. 2, 3, 8, 9 and 14 to 20 were not lowered to the same level as the surface-treated test pieces of Sample Nos. 4 to 7 and 10 to 13.

It has been confirmed by the above experiment that the low-friction and wear characteristics such as initial adaptability of the double-layer lubrication coating composition 20 could be improved effectively by controlling the content of the graphite and/or molybdenum disulfide solid lubricant in the outer coating layer 21 to within the range of 50 to 95 wt %.

The binder resin contents and solid lubricant contents and the test/evaluation results of the coating compositions are indicated in TABLE 2 and FIG. 5. In TABLE 2 and FIG. 5, the adhesion strength was expressed as a ratio to that of Sample No. 22 or 41, i.e., the strength of adhesion between the aluminum alloy base material of AC8A-T6 (JIS H 5202) and the PAI binder resin.

TABLE 1

| Sample No. | Outer coating (wt %) | | | | Inner coating (wt %) | | | | Characteristics | | Remarks |
|---|---|---|---|---|---|---|---|---|---|---|---|
| | PAI | MoS$_2$ | GF | PTFE | PAI | MoS$_2$ | GF | PTFE | Friction coefficient [1] | Streak height (μm) [2] | |
| 1 | 100 | 0 | 0 | 0 | 67 | 0 | 33 | 0 | 100 | 7.8 | Comp. Ex. |
| 2 | 85 | 15 | 0 | 0 | 67 | 0 | 33 | 0 | 95 | 7.4 | Comp. Ex. |
| 3 | 70 | 30 | 0 | 0 | 67 | 0 | 33 | 0 | 92 | 7 | Comp. Ex. |
| 4 | 50 | 50 | 0 | 0 | 67 | 0 | 33 | 0 | 80 | 5.3 | Ex. |
| 5 | 40 | 60 | 0 | 0 | 67 | 0 | 33 | 0 | 62 | 4.5 | Ex. |
| 6 | 25 | 75 | 0 | 0 | 67 | 0 | 33 | 0 | 60 | 3 | Ex. |
| 7 | 5 | 95 | 0 | 0 | 67 | 0 | 33 | 0 | 61 | 0 | Ex. |
| 8 | 85 | 0 | 15 | 0 | 67 | 0 | 33 | 0 | 98 | 7.5 | Comp. Ex. |
| 9 | 70 | 0 | 30 | 0 | 67 | 0 | 33 | 0 | 95 | 7 | Comp. Ex. |
| 10 | 50 | 0 | 50 | 0 | 67 | 0 | 33 | 0 | 85 | 5.5 | Ex. |
| 11 | 40 | 0 | 60 | 0 | 67 | 0 | 33 | 0 | 66 | 5.3 | Ex. |
| 12 | 25 | 0 | 75 | 0 | 67 | 0 | 33 | 0 | 64 | 4.8 | Ex. |
| 13 | 5 | 0 | 95 | 0 | 67 | 0 | 33 | 0 | 63 | 2 | Ex. |
| 14 | 85 | 0 | 0 | 15 | 67 | 0 | 33 | 0 | 100 | 7.8 | Comp. Ex. |
| 15 | 70 | 0 | 0 | 30 | 67 | 0 | 33 | 0 | 98 | 7.4 | Comp. Ex. |
| 16 | 50 | 0 | 0 | 50 | 67 | 0 | 33 | 0 | 90 | 6.7 | Comp. Ex. |
| 17 | 40 | 0 | 0 | 60 | 67 | 0 | 33 | 0 | 86 | 6.6 | Comp. Ex. |
| 18 | 25 | 0 | 0 | 75 | 67 | 0 | 33 | 0 | 85 | 6.5 | Comp. Ex. |
| 19 | 5 | 0 | 0 | 95 | 67 | 0 | 33 | 0 | 83 | 6.7 | Comp. Ex. |
| 20 | 0 | 0 | 0 | 0 | 67 | 0 | 33 | 0 | 94 | 6.9 | Comp. Ex. (Single coating) |
| 21 | 0 | 0 | 0 | 0 | 0 | 0 | 0 | 0 | 162 | 9 | Comp. Ex. (No treatment) |

[1] As a ratio to the friction coefficient of Sample No. 1
[2] A streak height after the friction-wear test (A streak height before the friction-wear test: 10 μm)

[Sample Nos. 22 to 59]

Inner coating materials were prepared by using a polyamide-imide resin (PAI) as a binder and graphite (GF), molybdenum disulfide (MoS$_2$) or polytetrafluoroethylene (PTFE) as a solid lubricant. The solid lubricant contents of the inner coating materials were varied from 0 to 95 wt %. Outer coating materials were prepared by using a polyamide-imide resin (PAI) as a binder and molybdenum disulfide (MoS$_2$) as a solid lubricant. The solid lubricant contents of the inner coating materials were set to 95 wt %.

Test pieces of Sample Nos. 22 to 40 were surface treated in the same manner as those of Sample Nos. 1 to 20, except that only the inner coating layers were formed on the test pieces using the prepared inner coating materials (i.e. the test pieces of Sample Nos. 22 to 40 were coated with single-layer coating composition films). Further, test pieces of Sample Nos. 41 to 59 were surface treated in the same manner as to those of Sample Nos. 1 to 20 using the prepared inner and outer coating materials.

Each of the test pieces of Sample Nos. 22 to 59 was tested for the strength of adhesion of the coating composition film to the base material.

The test samples of Sample Nos. 22 to 25, 29 to 31, 35 to 37, 41 to 44, 48 to 50 and 54 to 56 in which the content of the solid lubricant in the inner coating layer was 0 to 50 wt % had good adhesion between the base material and the coating composition film. In particular, the test samples of Sample Nos. 22 to 25, 29 to 31, 41 to 44 and 48 to 50 in which the graphite or molybdenum disulfide was used as the solid lubricant of the inner coating layer was relatively high as compared to those of the test samples of Sample Nos. 35 to 37 and 54 to 56 in which the polytetrafluoroethylene was used as the solid lubricant of the inner coating layer.

On the other hand, the test samples of Sample Nos. 26 to 28, 32 to 34, 38 to 40, 45 to 47, 51 to 53, 57 to 59 in which the content of the solid lubricant in the inner coating layer exceeded 50 wt % had poor adhesion between the base material and the coating composition film and were not suitable for practical use.

It has been confirmed by the above experiment that the double-layer lubrication coating composition 20 could secure good adhesion to the base material 1a by controlling the content of the graphite and/or molybdenum disulfide solid lubricant in the inner coating layer 22 to within the range of 0 to 50 wt %.

TABLE 2

| Sample No. | Outer coating (wt %) | | | | Inner coating (wt %) | | | | Characteristics Adhesion strength [3] | Remarks |
|---|---|---|---|---|---|---|---|---|---|---|
| | PAI | MoS$_2$ | GF | PTFE | PAI | MoS$_2$ | GF | PTFE | | |
| 22 | 0 | 0 | 0 | 0 | 100 | 0 | 0 | 0 | 100 | Comp. Ex. |
| 23 | 0 | 0 | 0 | 0 | 85 | 15 | 0 | 0 | 99 | Comp. Ex. |
| 24 | 0 | 0 | 0 | 0 | 70 | 30 | 0 | 0 | 95 | Comp. Ex. |
| 25 | 0 | 0 | 0 | 0 | 50 | 50 | 0 | 0 | 90 | Comp. Ex. |
| 26 | 0 | 0 | 0 | 0 | 40 | 60 | 0 | 0 | 80 | Comp. Ex. |
| 27 | 0 | 0 | 0 | 0 | 25 | 75 | 0 | 0 | 10 | Comp. Ex. |
| 28 | 0 | 0 | 0 | 0 | 5 | 95 | 0 | 0 | 0 | Comp. Ex. |
| 29 | 0 | 0 | 0 | 0 | 85 | 0 | 15 | 0 | 97 | Comp. Ex. |
| 30 | 0 | 0 | 0 | 0 | 70 | 0 | 30 | 0 | 91 | Comp. Ex. |
| 31 | 0 | 0 | 0 | 0 | 50 | 0 | 50 | 0 | 83 | Comp. Ex. |
| 32 | 0 | 0 | 0 | 0 | 40 | 0 | 60 | 0 | 35 | Comp. Ex. |
| 33 | 0 | 0 | 0 | 0 | 25 | 0 | 75 | 0 | 8 | Comp. Ex. |
| 34 | 0 | 0 | 0 | 0 | 5 | 0 | 95 | 0 | 0 | Comp. Ex. |
| 35 | 0 | 0 | 0 | 0 | 85 | 0 | 0 | 15 | 95 | Comp. Ex. |
| 36 | 0 | 0 | 0 | 0 | 70 | 0 | 0 | 30 | 80 | Comp. Ex. |
| 37 | 0 | 0 | 0 | 0 | 50 | 0 | 0 | 50 | 60 | Comp. Ex. |
| 38 | 0 | 0 | 0 | 0 | 40 | 0 | 0 | 60 | 15 | Comp. Ex. |
| 39 | 0 | 0 | 0 | 0 | 25 | 0 | 0 | 75 | 5 | Comp. Ex. |
| 40 | 0 | 0 | 0 | 0 | 5 | 0 | 0 | 95 | 0 | Comp. Ex. |
| 41 | 5 | 95 | 0 | 0 | 100 | 0 | 0 | 0 | 100 | Ex. |
| 42 | 5 | 95 | 0 | 0 | 85 | 15 | 0 | 0 | 98 | Ex. |
| 43 | 5 | 95 | 0 | 0 | 70 | 30 | 0 | 0 | 93 | Ex. |
| 44 | 5 | 95 | 0 | 0 | 50 | 50 | 0 | 0 | 91 | Ex. |
| 45 | 5 | 95 | 0 | 0 | 40 | 60 | 0 | 0 | 82 | Comp. Ex. |
| 46 | 5 | 95 | 0 | 0 | 25 | 75 | 0 | 0 | 12 | Comp. Ex. |
| 47 | 5 | 95 | 0 | 0 | 5 | 95 | 0 | 0 | 0 | Comp. Ex. |
| 48 | 5 | 95 | 0 | 0 | 85 | 0 | 15 | 0 | 95 | Ex. |
| 49 | 5 | 95 | 0 | 0 | 70 | 0 | 30 | 0 | 93 | Ex. |
| 50 | 5 | 95 | 0 | 0 | 50 | 0 | 50 | 0 | 85 | Ex. |
| 51 | 5 | 95 | 0 | 0 | 40 | 0 | 60 | 0 | 33 | Comp. Ex. |
| 52 | 5 | 95 | 0 | 0 | 25 | 0 | 75 | 0 | 10 | Comp. Ex. |
| 53 | 5 | 95 | 0 | 0 | 5 | 0 | 95 | 0 | 0 | Comp. Ex. |
| 54 | 5 | 95 | 0 | 0 | 85 | 0 | 0 | 15 | 93 | Comp. Ex. |
| 55 | 5 | 95 | 0 | 0 | 70 | 0 | 0 | 30 | 78 | Comp. Ex. |
| 56 | 5 | 95 | 0 | 0 | 50 | 0 | 0 | 50 | 63 | Comp. Ex. |
| 57 | 5 | 95 | 0 | 0 | 40 | 0 | 0 | 60 | 17 | Comp. Ex. |
| 58 | 5 | 95 | 0 | 0 | 25 | 0 | 0 | 75 | 3 | Comp. Ex. |
| 59 | 5 | 95 | 0 | 0 | 5 | 0 | 0 | 95 | 0 | Comp. Ex. |

[3] As a ratio to the adhesion strength of Sample No. 22, 41

As described above, it is possible that the coating composition 20 of the present embodiment can combine good adhesion to the piston base material 1a with improved low-friction and wear characteristics such as initial adaptability with the cylinder wall 3.

The entire contents of Japanese Patent Application No. 2009-063764 (filed on Mar. 17, 2009) are herein incorporated by reference.

Although the present invention has been described with reference to the above-specific embodiments of the invention, the invention is not limited to these exemplary embodiments. Various modification and variation of the embodiments described above will occur to those skilled in the art in light of the above teachings. For example, any other solid lubricant such as polytetrafluoroethylene (PTFE) can be used in combination with the graphite and/or molybdenum disulfide. The scope of the invention is defined with reference to the following claims.

What is claimed is:

1. A piston for an internal combustion engine, comprising:
   a skirt portion having an outer circumferential surface formed with surface grooves for sliding contact with a cylinder wall of the engine,
   the skirt portion comprising:
   a piston base material; and
   a film of lubrication coating composition defining the outer circumferential surface formed with said surface grooves and having an inner coating layer formed on a surface of the piston base material and an outer coating layer formed on a surface of the inner coating layer opposite the piston base material,
   wherein the outer coating layer is more susceptible to wear than the inner coating layer;
   wherein the piston satisfies the following dimensional condition: $t2 \geq a-5$ μm, where t2 (μm) is a thickness of the outer coating layer, and a is a groove depth (μm) of the surface grooves of the film of lubrication coating composition before wearing of the coating composition; and
   wherein the thickness of the outer coating layer is 3 to 6 μm.

2. The piston according to claim 1, wherein the piston satisfies the following dimensional condition: $t1 > 2$ μm, where t1 (μm) is a thickness of the inner coating layer.

3. The piston according to claim 2, wherein the thickness of the inner coating layer is 5 to 11 μm.

4. The piston according to claim 1,
   wherein the inner coating layer and the outer coating layer contain at least one kind of binder resin selected from the group consisting of a polyamide-imide resin, a polyimide resin and an epoxy resin;
   wherein the inner coating layer contains 50% by weight or less of at least one of graphite and molybdenum disulfide as a solid lubricant based on the total weight of the inner coating layer; and wherein the outer coating layer contains 50 to 95% by weight of at least one of graphite and molybdenum disulfide as a solid lubricant based on the total weight of the outer coating layer.

5. The piston according to claim 1, wherein, during sliding contact of the piston skirt portion and the engine cylinder wall, the outer coating layer is worn in such a manner that the groove depth of the surface grooves falls to 5.5 μm or smaller.

6. The piston according to claim 5,
wherein the binder resin of the inner and outer coating layers is at least one of a polyamide-imide resin, a polyimide resin and an epoxy resin;
wherein the inner coating layer contains 50% by weight or less of at least one of graphite and molybdenum disulfide as a solid lubricant based on the total weight of the inner coating layer; and
wherein the outer coating layer contains 50 to 95% by weight of at least one of graphite and molybdenum disulfide as a solid lubricant based on the total weight of the outer coating layer.

* * * * *